Jan. 5, 1965     D. B. PALL ETAL     3,164,164
PRESSURE-RESPONSIVE VALVES
Filed Feb. 2, 1960
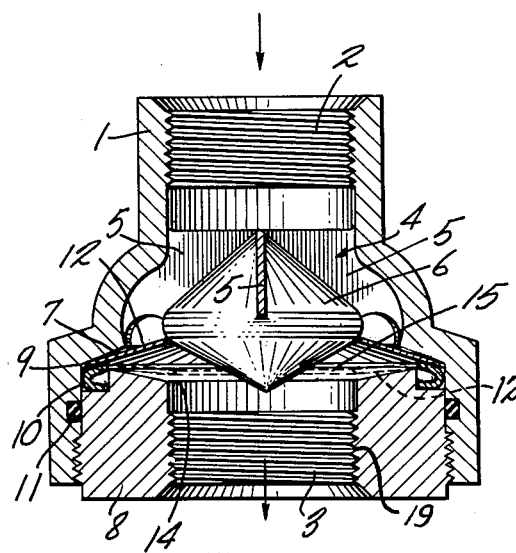
FIG. 1.
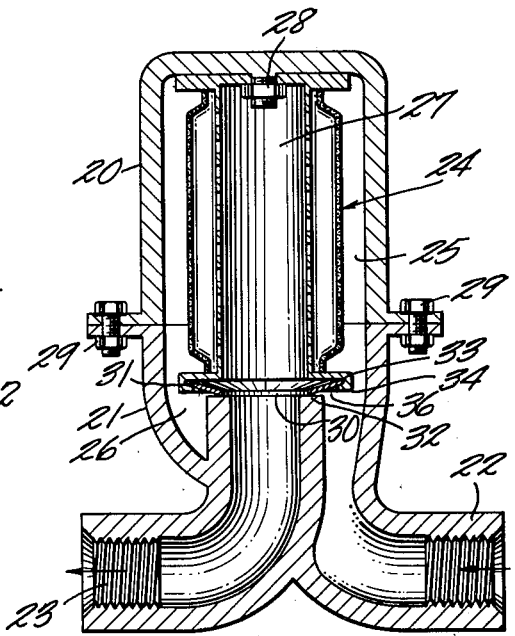
FIG. 2.
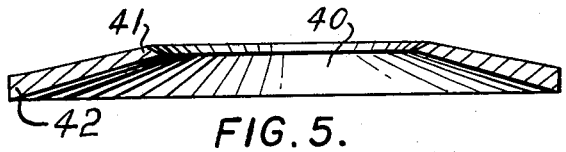
FIG. 5.
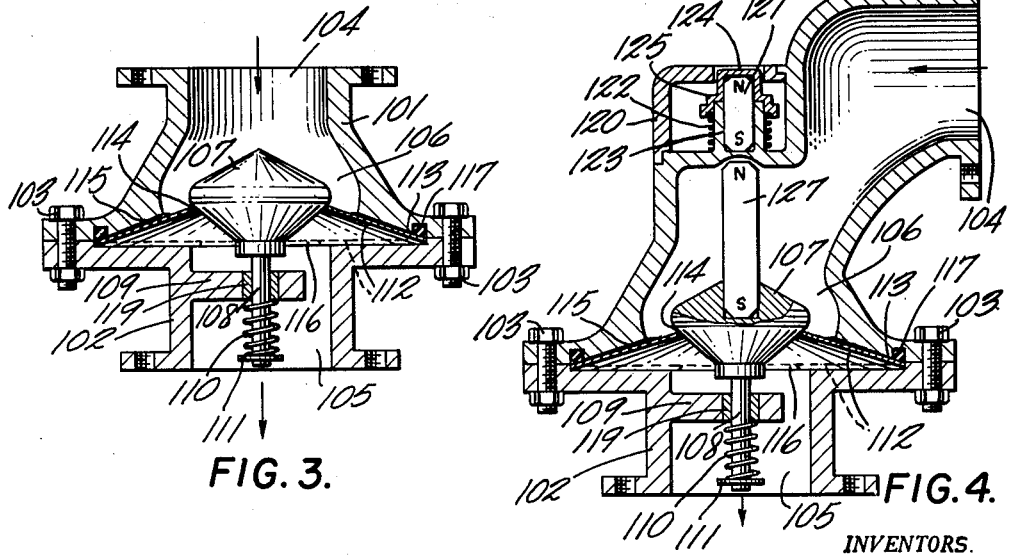
FIG. 3.
FIG. 4.
INVENTORS.
DAVID B. PALL &
HARRY D. CORDES
BY
Watson Leavenworth & Kelton
ATTORNEYS.

United States Patent Office 3,164,164
Patented Jan. 5, 1965

3,164,164
PRESSURE-RESPONSIVE VALVES
David B. Pall, Roslyn Heights, and Harry D. Cordes, Wantagh, N.Y., assignors to Pall Corporation, Glen Cove, N.Y., a corporation of New York
Filed Feb. 2, 1960, Ser. No. 6,150
12 Claims. (Cl. 137—467)

This invention relates to pressure-responsive relief and regulating valves and to filter units and pressure indicators incorporating the same, and more particularly to pressure-responsive valves in which the valve element is in the form of an annular spring disk.

Relief valves ordinarily employ a spring-loaded valve seal which is forced from its seat and thus opens the valve when a predetermined pressure differential across the valve is exceeded. A typical structure is shown in U.S. Patent No. 2,704,548 to Ralston, issued March 22, 1955. Ralston spring-biases a valve poppet against the valve seat, and amounts the poppet on a flexible diaphragm to seal off the spring. This arrangement has the important advantage of sealing off the spring from dirt which would obstruct its movement, a serious problem when the valve mechanism includes sliding parts. However, springs are not ideal for this purpose, because they have linear characteristics. The pressure required to move the poppet in a structure of this type is directly proportional to the pressure exerted by the spring, and this increases as the spring is compressed. Once the valve has cracked, a considerably higher pressure is necessary to open the valve wider. Frequently, it is desirable to have a certain minimum flow-through when a valve cracks open at the predetermined pressure, and a possibility of a considerably higher flow-through at only a small further increase in pressure. This a spring-loaded valve is unable to do.

In accordance with the invention, a pressure-responsive valve is provided which gives a large predetermined opening at a given differential pressure across the valve, so that a large flow-through can be obtained at the valve cracking pressure. This valve employs an annular spring disk biased against a valve seat, and arranged to move out from engagement with the seat at a predetermined pressure differential, the crack-open pressure, thus exposing an annular opening.

The disk is bowed against the direction of flow. It can be made so as to open without changing direction of bow, in which event it is self-closing when pressure is reduced, or to snap fully open, in which event it becomes bowed in the direction of flow, and must be reset manually. The flow-through required is provided by so dimensioning the disk and valve seat as to give an annular opening of the predetermined flow capacity when the valve cracks open. Disk thickness, amount of bow, disk diameter and annular opening diameter are determined by the pressure differential to be resisted, i.e., the resistance to be offered by the spring action of the disk, and the flow capacity needed at the crack open pressure differential.

The spring disk of the invention is made of material of high yield strength and high hardness. Materials having minimum yield strengths of 30,000 to 250,000 p.s.i.g. can be used, with Rockwell hardness of the order of C-45. Steel, stainless steel, and nickel chromium alloys are satisfactory, as also are certain synthetic resins such as polytetrafluoroethylene and polyoxymethylene. Metal spring disks of the desired type are available, and are known as Belleville washers.

The disk can be uniform in thickness throughout or can vary in thickness, thinner at the center than at the edge, to give improved flexing and sealing. It can be made thin enough to open without changing direction of bow, in which event its response to higher pressures above the crack open pressure differential is nonlinear, but the size of opening is dependent upon the pressure differential. In this form, the valve prevents sudden pressure drops on the inlet side of the system. This type of disk is called a flex spring disk or washer.

The disk also can be so designed as to resist flexing, so as to snap open and reverse direction at a given differential pressure. This form gives a maximum opening at a minimum pressure, which is adapted to quickly correct any clogged condition in the line and prevent starvation of the system on the outlet side. This type of disk is called a snap spring disk or washer.

The disk can take a variety of forms and shapes. The disk can be disposed surrounding the valve seat, such as is shown in FIGURES 1 to 4, i.e., a washer, or it can be arranged to contact the valve seat on one surface, or on both surfaces. The configuration of the disk is not critical, but can be fashioned to fit any need. The disk can be arranged to seat in either direction of bow, so that the valve can be reversible, i.e., responsive to differential pressures exerted from either side of the disk.

The valve seat can be made of the same or of different materials. It is advantageous under some conditions to fabricate the valve seat of material more resilient than that used for the disk. For good corrosion resistance, all parts of the valve can be of stainless steel.

Several embodiments of valve structures in accordance with the invention are shown in the drawings, in which FIGURES 1 is a central vertical sectional view through a pressure-responsive relief valve of the invention, using an annular snap spring disk which surrounds the valve seat;

FIGURE 2 is a central vertical sectional view through a filter assembly incorporating a relief valve in accordance with the invention, using an annular flex spring disk which surrounds the valve seat;

FIGURE 3 is a central vertical sectional view of another embodiment of pressure-responsive relief valve in accordance with the invention;

FIGURE 4 is a vertical sectional view of a system including the relief valve in accordance with FIGURE 3, arranged to actuate a pressure indicator at the time or shortly before the valve cracks open;

FIGURE 5 is a vertical sectional view of another embodiment of spring disk which is thinner at its center than at its outer edge.

The relief valve of FIGURE 1 comprises a housing 1 provided with internally-threaded inlet and outlet passages 2 and 3, respectively. Fixed in a chamber 4 between the inlet and outlet pasages by three support vanes 5, is a poppet 6, which serves as the valve seat. Seated upon the poppet is an annular Belleville spring-type stainless steel disk washer 7, the central portion of which is bowed towards the inlet 2. The inner edge of the washer engages the periphery of the poppet just below its midpoint.

The washer is removable, being held in position in the chamber by the insert 8, which is threaded into the outlet pasage of the housing 1. The outer edge 9 of the washer engages the inside of the housing 1, and is sealed against leakage by a V-type sealing element 10, a bi-flanged steel ring, the V-faces of which respectively engage the washer and an indentation in the insert 8. The element 10 is not essential; it can be omitted, in which event the washer seats against the insert 8. A supplemental seal between the housing 1 and the insert is provided by the O-ring 11, which seats in an indentation in the housing. Both V- and O-rings can be of metal. The O-ring can be of resilient material, such as rubber. Thus, leakage cannot occur either at the insert or at the washer.

The bowed face 12 of the washer 7, on the inlet side, abuts against a similarly shaped, inward projection of the housing 1, providing the limit for the bow, and support at the center of the disk to prevent flexing of the disk, so that it cannot pass beyond the poppet 6. There is a correspondingly shaped projection 14 on the face of the insert 8 on the other side of the washer. The washer is of the spring type, and is biased against the face of the poppet 6 at a force to resist a predetermined pressure differential between the inlet and outlet passages. The force can be adjusted by adjusting the position of the insert on the threads 19 to provide more or less space for the washer.

In operation, when the pressure of liquid in the chamber 4 exceeds the spring force of the washer, the washer snaps, and the bowed annular portion reverses direction, assuming the position shown by the dotted lines, so that the outlet side of the washer now abuts against the upper face 14 of the insert 8, thus opening an annular passage 15 between the washer and the poppet, through which liquid may flow into the bypass line (not shown) from the outlet 3 until the pressure is relieved. The washer can then be reset in position manually when the condition relieved by the valve has been corrected.

The relief valve of FIGURE 1 is quite useful in association with a bypass line to relieve a clogged filter. A structure in which it is used directly in the filter assembly itself is shown in FIGURE 2.

The filter structure comprises a two piece housing 20 and 21, held together by bolts 29. The part 21 of the housing is provided with two passages 22 and 23, communicating respectively to the opposite sides of a cylindrical filter element 24. The passage 22 opens into the peripheral portion 25 of chamber 26 within the housing 20. The filter element 24 encloses a central passage 27 within the housing which communicates with the passage 23.

The filter element is composed of any desirable filtering material, for example, a bonded wire mesh prepared in accordance with U.S. Patents Nos. 2,925,650, issued February 23, 1960, and 3,049,796, issued August 21, 1962. The element is attached to the housing 20 by the nut 28.

The relief valve of the invention is fitted in chamber 26 between the filter element and the inner end of passage 23. The central annular portion 30 of the Belleville type washer 31 abuts against the end face 32 of the passage 23. The outside edge 33 of the Belleville washer is held in a leakproof seal against the flange 34 projecting from the filter element. In the structure shown, 22 is intended as the inlet passage and 23 as the outlet passage, and the washer is accordingly bowed against the direction of flow. The spring washer is adapted to resist up to a predetermined pressure differential across the filter element, and while closed directs fluid entering the filter structure via the inlet 22 through the filter element 24 to the channel 27 and thence to the outlet 23. However, whenever the filter becomes partially clogged, and the pressure differential between the inlet and the outlet reaches a predetermined value, which corresponds to the rated resistant spring force of the washer, the Belleville washer cracks open, but does not snap so that the bow reverses direction. The washer flexes more, if the pressure differential increases, due to further blocking of the filter. An annular opening 36 is formed between the flexed washer and the upper face of the passage 23, and the size of the opening is proportional to the blocking of the filter, maintaining a head of pressure at the inlet side and forcing such fluid as can to pass through the filter, while a sufficient proportion of fluid entering through the inlet 22 and bypass the filter directly into the outlet 23, and maintain flow on the outlet side as well.

The relief valve shown in FIGURE 3 employs a poppet which is capable of slight reciprocating movement against a spring, so that the poppet is free to align itself with the inside diameter of the Belleville washer and improve the seating thereon, without the need for accurate location of the washer in assembling. Such movement also ensures a tighter seal at high differential pressures, approaching the crack-open pressure differential.

The relief valve comprises a two piece housing 101 and 102 hold together by bolts 103, and provided with inlet and outlet passages 104 and 105, respectively. The inlet passage 104 opens into a chamber 106 in the housing 101 in which is placed a poppet 107 having a shaft 108 projecting therefrom which passes loosely through the bracket arm 109 and sleeve 119 attached to housing 102, giving the poppet some "play." A spring 110 is mounted around the shaft 108, and is held upon the shaft by the snap ring 111; its other end rests against the bracket 109. The poppet is urged towards the bracket 109 which also serves to limit the poppets downward motion by the action of the spring.

Surrounding the poppet is a Belleville type washer 112, the outer edge 113 of which engages the housing in sealing relationship by the O-ring seal 117, and the inner edge 114 of which seals against the poppet. The washer is bowed against the direction of flow, and its central portion is supported against the projecting portion 115 of the housing 101 to prevent movement of the washer past the poppet. The pressure differential required to open the washer, away from engagement with the poppet is predetermined, and when the washer opens, it moves to a position such as is shown by the dotted lines. Thus, an annular passage 116 is opened between the inner edge of the valve and the outer face of the poppet.

In operation, an increase in differential pressure approaching the crack open pressure first urges the poppet 107 downwardly against the action of the spring washer 112, and increases the tightness of the seal between the washer and the poppet, so as to prevent leakage at increasing pressures. When, however, the pressure has reached a predetermined value, the washer opens, opening the annular passage between the washer and poppet and permitting liquid to flow through the valve.

This type of valve is particularly useful in conjunction with a magnetic pressure indicator, such as is shown in FIGURE 4. In this case, the valve housing 101 is modified so as to provide for an offset inlet passage 104 opening into the chamber 106. In the upper portion of the housing opposite the valve is fixed a removable enclosure 120, within which is fixed a reciprocable magnetic element 121 which is spring mounted at 122 so as to be urged in an upwardly direction in the cylindrical passage 123. The element has an indicator cap 124 which can be colored a bright eye-catching color, such as red. The cap has a flange stop 125 which prevents the cap from popping entirely out of the enclosure 120 under the action of the spring 122.

A second magnetic element 127 is attached to the poppet 107, the poles being such that the elements 121 and 127 are mutually attracting when within a short distance, say 1/8 inch, of each other, such that the element 121 is held within the enclosure against the action of the spring 122. The spring 122 has only a slight force, less than that of the magnets 121 and 127. The poppet 107 is arranged to move downwardly a greater distance than this, say 3/8 inch.

The remainder of the parts and the operation thereof are the same as in FIGURE 3.

In operation, when the pressure differential across the washer approaches a predetermined value, the poppet 107 is moved downwardly, thus tightening the seal against the Belleville washer, and at the same time withdrawing the inner magnetic element 127 from close contact with the outer magnetic element 121. At a predetermined position of the poppet 107, the force of attraction between the elements 121 and 127 is reduced to the point where the action of the spring 122 exceeds the magnetic attraction between the elements, so that the element 121 pops out of the enclosure, as urged by the spring, giving an indication that the pressure at which the relief valve cracks open is about to be reached. This is a danger signal, which if recognized in time can permit correction of the condition which would lead to cracking of the valve. If, however, no action is taken, the relief valve cracks open nonetheless, and prevents damage to the system.

It will be understood that the magnetic elements 121 and 127 also can be so arranged that an indication is not given until after the relief valve has cracked open, thus showing when the valve is open.

It will be noted that the housing between the elements 121 and 127 is very thin, and is magnetically permeable, so as to permit mutual magnetic attraction between the elements, but that no opening is provided, so that no dirt can be carried into the enclosure, to affect the operation of the indicator. The distance over which the elements 121 and 127 magnetically attract each other, such that the element 121 is kept in a retracted nonindicating position, is not critical, but depends upon the strength of the magnets, and the amount of free nonactuating movement required of the poppet. Usually, it is of the order of ¼ to ⅟₁₆ inch. The poppet, of course, must be free to move over a greater distance at the desired indicating pressure differential.

The spring disc of FIGURE 5 is similar to that shown in FIGURE 1, but employs a spring disk 40, which has a thinner cross-section at its inner edge 41, than at its outer edge 42, thereby giving improved flexing and sealing against the central poppet 6. In other respects, the device is similar to that shown in FIGURE 1.

The relief valves of the invention are quite simple and inexpensive to construct. Since the valve itself has no sliding parts, it is friction-free, and cannot jam as a result of dirt collecting in the annulus. At the same time, the spring disk can be made thin enough so as to flex against the valve seat, giving very tight seating with extremely low leakage rates up to the crack-open pressure. Since there are no parts requiring lubrication, the valves can be used equally well with both lubricating and nonlubricating fluids.

Other arrangements for paired spring disks will be apparent to those skilled in this art, and all such arrangements are encompassed by the claims which follow.

Fluid flow conditions of all kinds can be met by appropriate design of the spring disk to any load-deflection characteristics required in the system. The geometry of these disks is established by the disks' outside diameter and inside diameter, its free height measured from the inside edge (along the perpendicular to the outside edge) and its thickness. Proper selection of the geometry, using mathematical tables and equations of Fortini, Machine Design, September 4, 1958, "Conical-Disc Springs," will give a valve capable of pressure-relieving response to any type of load in any desired way. Valves can be designed that are capable of relieving pressure and decreasing pressure drop down to a minimum, almost zero, with or without a change in direction of bow, as desired, and without any further increase in pressure beyond the crack-open pressure. They can also be designed to respond linearly or nonlinearly to increase in pressure higher than the crack-open pressure by further increasing their deflection and hence increasing the size of the valve opening.

We claim:

1. A combined pressure-responsive valve and pressure relief indicator, comprising a housing, intercommunicating inlet and outlet passages therein, a valve seat across the line of fluid flow between said passages, a nondistensible annular spring disk valve surrounding the valve seat, the inner periphery of the disk being biased to normally engage the valve seat to close off the line, said disk being bowed against the direction of fluid flow through the valve and being supported at its outer periphery, the disk being responsive to a predetermined fluid pressure differential across the disk exceeding the spring resistance at least of a central portion adjacent its inner periphery to swing said peripheral portion out of engagement with the valve seat and open an annular passage between its inner periphery and the valve seat, whereby an increase in pressure differential between opposite sides of the valve disk exceeding the spring resistance of a portion thereof causes the valve to open and increased fluid to flow from the inlet to the outlet passage tending to equalize the fluid pressures acting on opposite sides of the valve disk, the valve seat being slidably mounted on a shaft carried by a bracket fixed to the housing, and being spring-biased into engagement with the disk, means to restrict the movement of the valve seat operative upon opening of the spring disk valve to permit opening of the annular passage, a first magnetic element attached to and movable with the valve seat, and a second magnetic element slidably mounted in the housing and movable towards and away from the first magnetic element, said second element being normally retained by the first element by magnetic attraction but being spring-biased away from said first element, and the first magnetic element being movable out from magnetically attracting position by movement of the valve seat, in which position the second magnetic element is movable by the spring to an indicating position, thereby giving warning of the pressure condition in the line.

2. A combined pressure-responsive valve and pressure indicator in accordance with claim 1, in which the second magnetic element is arranged to pop out of the housing to give a visual indication of the pressure condition in the line.

3. A pressure-responsive valve comprising a housing, intercommunicating inlet and outlet passages therein, a valve seat positioned across the line of fluid flow between said passages, and a substantially nondistensible bowed annular spring disk valve, a portion of whose surface seals against the valve seat, and is spring biased thereagainst to close off the line, the disk being responsive to a predetermined fluid-pressure differential across the disk at an annular portion thereof exceeding the spring resistance of the portion adjacent the seal, the spring disk being constructed to snap and reverse the direction of bow, to swing said annular portion out of engagement with the valve seat and open an annular passage between it and the valve seat, and to remain in the reverse direction until manually reset, whereby an increase in pressure differential between opposite sides of the valve disk exceeding the sping resistance of a portion thereof causes the valve to open and increased fluid to flow from the inlet to the outlet passage tending to equalize the fluid pressures acting on opposite sides of the valve disk.

4. A pressure-responsive valve in accordance with claim 3, in which the disk sealing surface is at a peripheral portion of the disk.

5. A pressure-responsive valve in accordance with claim 3 in which the disk sealing surface is at a central portion of the disk.

6. A pressure-responsive valve in accordance with claim 3 in which the disk is bowed against the direction of fluid flow through the valve, and is supported on its outer periphery.

7. A pressure-responsive valve comprising a housing, intercommunicating inlet and outlet passages therein, a valve seat positioned across the line of fluid flow between said passages, and a substantially nondistensible annular spring-disk valve thinner at its inner periphery than at its edge, and a portion of whose surface seals against the valve seat, and is spring biased thereagainst to close off the line, the disk being responsive to a predetermined fluid pressure differential across the disk at an annular portion thereof, exceeding the spring resistance of the portion adjacent the seal to swing said portion out of engagement with the valve seat, and open an annular passage between it and the valve seat, whereby an increase in pressure differential between opposite sides of the valve disk exceeding the spring resistance of a portion thereof causes the valve to open and increase fluid flow from the inlet to the outlet passage tending to equalize the fluid pressures acting on opposite sides of the valve disk.

8. A pressure-responsive valve in accordance with claim 7 in which the disk sealing surface is at a peripheral portion of the disk.

9. A pressure-responsive valve in accordance with claim 8 in which the disk sealing surface is at a central portion of the disk.

10. A pressure-responsive valve in accordance with claim 7 in which the disk is bowed against the direction of fluid flow through the valve, and is supported on its outer periphery.

11. A pressure-responsive valve comprising a housing, intercommunicating inlet and outlet passages therein, a valve seat positioned across the line of fluid flow between said passages, the valve seat being slidably mounted on a shaft carried by a bracket fixed to the housing, a substantially non-distensible annular spring-disk valve, a portion of whose surface seals against the valve seat, the valve seat being spring-biased into engagement with the spring disk and the spring disk being spring-biased against the valve seat to close off the line, the disk being responsive to a predetermined fluid pressure differential across the disk at an annular portion thereof exceeding the spring resistance of the portion adjacent the seal to swing said portion out of engagement with the valve seat and open an annular passage between it and the valve seat, and stop means limiting movement of the valve seat relative to the disk to permit the disk to swing said portion out of engagement with the valve seat, whereby an increase in pressure differential between opposite sides of the valve disk exceeding the spring resistance of a portion thereof causes the valve to open and increased fluid to flow from the inlet to the outlet passage tending to equalize the fluid pressure acting on opposite sides of the valve disk.

12. A pressure-responsive valve in accordance with claim 11 in which the valve seat is in the form of a poppet responsive to fluid pressure to move in a direction towards the spring disk.

References Cited in the file of this patent

UNITED STATES PATENTS

| | | |
|---|---|---|
| 213,118 | Locke | Mar. 11, 1879 |
| 2,585,863 | Smith | Feb. 12, 1952 |
| 2,615,675 | Mellert | Oct. 28, 1952 |
| 2,645,452 | Lucas | July 14, 1953 |
| 2,669,707 | Ehrman | Feb. 16, 1954 |
| 2,704,548 | Ralston | Mar. 22, 1955 |
| 2,729,339 | McCoy | Jan. 3, 1956 |
| 2,879,892 | Frakes | Mar. 31, 1959 |
| 2,942,572 | Pall | June 28, 1960 |

FOREIGN PATENTS

| | | |
|---|---|---|
| 946,760 | Germany | Aug. 2, 1956 |
| 1,132,251 | France | Oct. 29, 1956 |